US 8,082,590 B2

(12) United States Patent
Kim et al.

(10) Patent No.: US 8,082,590 B2
(45) Date of Patent: Dec. 20, 2011

(54) APPARATUS AND METHOD OF DETECTING AND CONTROLLING PRIVILEGE LEVEL VIOLATION PROCESS

(75) Inventors: Su Yong Kim, Daejeon (KR); Dae Sik Choi, Daejeon (KR); Dong Hyun Lee, Daejeon (KR); Do Hoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 938 days.

(21) Appl. No.: 12/055,381

(22) Filed: Mar. 26, 2008

(65) Prior Publication Data
US 2008/0313417 A1 Dec. 18, 2008

(30) Foreign Application Priority Data

Jun. 18, 2007 (KR) ........................ 10-2007-0059544

(51) Int. Cl.
*G06F 12/14* (2006.01)
(52) U.S. Cl. ......................................... 726/27; 711/163
(58) Field of Classification Search ................ 726/9, 26, 726/27, 28, 29; 713/224, 201, 212, 213, 713/220, 223; 709/204, 201, 220, 227; 380/3, 380/4, 5, 200, 201, 202, 203, 227
See application file for complete search history.

(56) References Cited

U.S. PATENT DOCUMENTS
2005/0108578 A1* 5/2005 Tajalli et al. ............... 713/201
2006/0075508 A1* 4/2006 Guo et al. ...................... 726/27

FOREIGN PATENT DOCUMENTS
KR 1020060134334 12/2006

OTHER PUBLICATIONS
Hwang-Bin Yim et al; "An Extended Role-Based Access Control Model with Multi-level Security Control", Hoenonmunji Electronics-TE Article 39 Issue 3, pp. 90-97 (2002).

* cited by examiner

*Primary Examiner* — Vivek Srivastava
*Assistant Examiner* — Nega Woldemariam
(74) *Attorney, Agent, or Firm* — Ladas & Parry LLP

(57) ABSTRACT

Provided are an apparatus and method of detecting and controlling a privilege level violation process. The apparatus monitors whether higher-privileged processes depend on information provided from lower-privileged objects or denies the higher-privileged processes to access the lower-privileged objects. The apparatus is provided in a process, and monitors whether a process accesses to a lower-privileged object. The apparatus gives a warning message or denies an access of the process to the lower-privileged object when it detects that the higher-privileged process access to the lower-privileged object. Therefore, the apparatus of detecting and controlling a privilege level violation process detects weaknesses that may be caused by privilege level violation, thus allowing a system to be safely operated.

11 Claims, 3 Drawing Sheets

APPARATUS AND METHOD OF DETECTING AND CONTROLLING PRIVILEGE LEVEL VIOLATION PROCESS

BACKGROUND OF THE INVENTION

1. Field of the Invention

The present invention relates to an apparatus and a method of giving a warning message to a user or denying an access to an object by monitoring whether higher-privileged processes depend on information provided from lower-privileged objects. Herein, a program means an executing program or a portion thereof, and an object means a medium used to store, read, alter or exchange information. Examples of the object may be files, registry keys, and so forth.

2. Description of the Related Art

Since Windows Vista has been opened to the public in 2007, much attention is being paid on main security mechanisms of Windows Vista. A mandatory integrity control (MIC), which is one of the main security mechanisms of the Window Vista, classifies an object such as a file, a folder and a registry key into a variety of integrity levels, e.g., Untrusted (lowest integrity level), Low, Medium, High, System and Installer (highest integrity level), and also adds integrity levels to processes. Thus, a lower integrity level process has a limited write privilege on an upper integrity level object. Of course, such a security mechanism has been used from the past although there is a difference in viewpoint between current and past security mechanisms.

Also in Unix environment, users are also classified into several levels, and a user having an administrator privilege can access files of all other users but general users are not allowed to access files of the user having the administrator privilege. In this way, objects are classified into several privileged levels and a process is allowed to access only lower- or equal-privileged objects, thereby protecting the objects safely, which is a classical security concept.

However, since Windows Vista advanced from such a classical security concept and interacts with the Internet, Windows Vista introduced the MIC so as to restrict an access to an object of a user privilege executing a web browser which may contain a serious security threat. That is, even if a control of a web browser is taken over an attacker due to some weaknesses, it is impossible to perform an illegal write operation upon user and system files, folders and registry keys of Medium or higher integrity level because the web browser is assigned the Low integrity level.

However, such a security concept has been developed to protect objects so that it is usefully protect the objects but cannot protect processes. There is no problem if all objects that a process accesses to acquire information have equal privilege levels. However, the process may access a lower-privileged object, which is problematic. If a update process of a relatively high privilege (hereinafter, referred to as 'higher-privileged update process') acquires update information from a file of a relatively low privilege (hereinafter, referred to as 'lower-privileged object), a lower-privileged malicious process alters the file so that the higher-privileged update process takes the malicious file for the update file and installs the malicious file. Resultingly, an illegal privilege escalation occurs because the lower-privileged malicious process can execute a desired activity with a high privilege. Therefore, the higher-privileged update process should confirm the availability of information necessarily when receiving the information from the lower-privileged object, and should not access the lower-privileged object if possible. However, such a problem may always exist due to an inexperienced operation or an error of software design, and may be a cause of privilege escalation weakness.

For example, the MIC of Windows Vista classifies all main objects such as files, registries, processes and folders into several privilege levels, i.e., Untrusted, Low, Medium, High, System and Installer, and allows an object having a privilege level equal to or lower than a privilege level of a process to perform write/read operations. That is, a 'High' level process has write/read privileges upon 'Untrusted', 'Low', 'Medium' and 'High' level objects. However, a 'Low' level process has write/read privileges upon 'Untrusted' and 'Low' level objects but has only a read privilege upon 'Medium' level or higher-privileged objects.

Although the MIS of Windows Vista is advantageous in that it is possible to safely protect higher-privileged objects by restricting a write privilege upon the higher-privileged objects, there may be a problem due to the read privilege as describe above.

Likewise, users also have different privilege levels in Windows, Windows NT, Linux, Unix, OS/2 and MAC system. That is, an administrator in all the Windows system including Windows Vista has the highest privilege level corresponding to a root of the Unix system, and general user accounts having limited privileges commonly exist in both the Windows system and the Unix system. In addition, various privilege levels exist in each a system, and a process executed by a higher-privileged user is allowed to access, i.e., write/read, an equal- or lower-privileged object while operating with a corresponding user privilege. Such a layered user privilege is also used to protect a higher-privileged object against a process executed by a lower-privileged user.

However, it is necessary to remove a risk occurring when a higher-privileged process performs a read operation on a lower-privileged object.

In the present invention, the case where a higher-privileged process accesses a lower-privileged object is defined as a privilege level violation, and such a process accessing the lower-privileged object is referred to as a privilege level violation process (hereinafter, this will be also referred to as a violation process for simplicity).

SUMMARY OF THE INVENTION

Accordingly, the present invention is directed to an apparatus and a method of detecting and controlling a privilege level violation process, which substantially obviates one or more problems due to limitations and disadvantages of the related art.

It is an object of the present invention to provide an apparatus and a method of detecting and controlling a privilege level violation process, which can monitor and detect that a higher-privileged process accesses a lower-privileged object, and deny an access to the lower-privileged object if necessary, in order to prevent the higher-privileged process from acquiring altered information from the lower-privileged object and executing an malicious activity.

It is another object of the present invention to provide an apparatus and a method of detecting and controlling a privilege level violation process, which can remove a risk that a higher-privileged process performs a specific work based on contents of a lower-privileged object by detecting whether or not a process executed by a higher-privileged user performs a read operation on the lower-privileged object and interrupting the read operation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an apparatus of detecting and controlling a privilege level violation process when a process accesses an object, includes: a process activity monitoring module detecting an access of the process to the object; a process information acquisition module driven by the process activity monitoring module to acquire process information; an object information acquisition module driven by the process activity monitoring module to acquire object information; a privilege level comparison module comparing privilege levels of the process and the object with each other by collecting each of the process information and the object information acquired by the process information acquisition module and the object information acquisition module; and a violation process management module driven when the process has a privilege level higher than the object, to thereby interrupt execution of the process or give a warning massage to a user.

In another aspect of the present invention, there is provided a method of detecting and controlling a privilege level violation process when a process accesses an object, includes the steps of: determining whether the process having a high privilege level accesses the object having a relatively lower privilege level detecting an access of the process to the object; acquiring process information; of the process accessing the object; acquiring object information of the object; determining whether a privilege level of the process is higher than a privilege level of the object by comparing the privilege levels with each other using the process information with the object information; and interrupting execution of the process or outputting a warning message according to a user's setting when the privilege level of the process is determined to be higher than the privilege level of the object.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
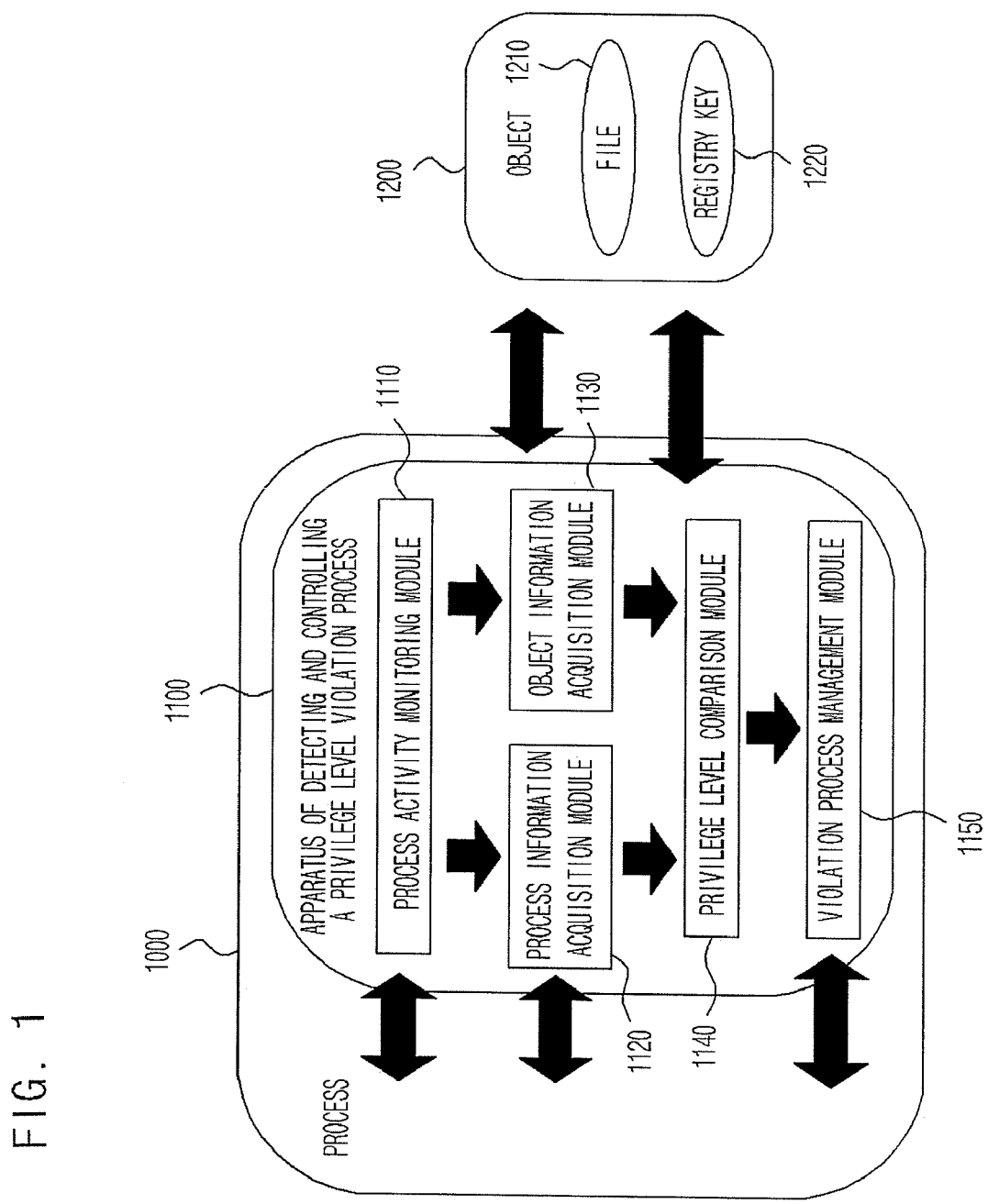
FIG. 1 illustrates a block diagram of a system including an apparatus of detecting and controlling a privilege level violation process according to an embodiment of the present invention.

FIG. 1 illustrates a block diagram of a system including an apparatus of detecting and controlling a privilege level violation process according to an embodiment of the present invention.

Referring to FIG. 1, the system of the present invention mainly includes a process 1000 and an object 1200. An apparatus 1100 of detecting and controlling a privilege level violation process is provided in the process 1000 so as to detect and control the privilege level violation of the process 1000. The apparatus 1100 of detecting and controlling a privilege level violation process includes a process activity monitoring module 1110, a process information acquisition module 1120, an object information acquisition module 1130, a privilege level comparison module 1140, and a violation process management module 1150.

The object 1200 includes a plurality of files 1210 and a plurality of registry keys 1220.

First, the process activity monitoring module 1110 monitors whether a specific process or the whole process 1000 existing in the system accesses the object 1200 or not. Generally, the meaning the process 1000 accesses the object 1200 is that the process 1000 reads the object 1200.

When it is detected that the process 1000 accesses the object 1200, the process activity monitoring module 1110 drives the process information acquisition module 1120 to acquire process information. The acquired process information contains information with regard to a privilege level of the process 1000, and general information with regard to a pathname and a name of the process 1000, etc. The process activity monitoring module 1110 also drives the object information acquisition module 1130 simultaneously with the process information acquisition module 1120. The object information acquisition module 1130 driven by the process activity monitoring module 1110 acquires information with regard to a privilege level of the object 1200, and object information with regard to a pathname and a name of the object 1200, etc.

Each of the process information and the object information acquired by the process information acquisition module 1120 and the object information acquisition module 1130 is transmitted to the privilege level comparison module 1140 and then collected. The privilege level comparison module 1140 compares privilege levels of the process 1000 and the object 1200 with each other using the process information and the object information, thereby driving the violation process management module 1150 only when the privilege level of the process 1000 is higher than that of the object 1200.

When the privilege level of the process is equal to or lower than the privilege level of the object, an additional work is not necessary because there is no risk of privilege escalation. Accordingly, the violation process management module 1150 does not operate in this case.

If, however, the privilege level of the process 1000 is higher than that of the object 1200 that the process 1000 is trying to access, the violation process management module 1150 interrupts the execution of the violation process or gives a warning message to a user according to a user's setting. In the case where the violation process management module 1150 gives the warning message, a name and a pathname of a privilege level violation process, a name and a pathname of an object to be accessed, and privilege levels of the process and the object 1200 are displayed in the warning message. The user detects that the specific process accesses the lower-privileged object 1200 through the warning message, and may deny or allow the process 1000 to access the lower-privileged object 1200 according to a user's setting.

In the present invention, the privilege level is a term commonly designating a user privilege hierarchy with multi levels, which is used in the MIC of Windows Vista, Windows, Windows NT, Linux, Unix, OS/2, MAC OS, and so forth. That is, the present invention is applicable to all the cases where a higher-privileged process accesses and reads a lower-privileged object according to the privilege level in all operating systems in which all the privilege levels are set. Here, the object 1200 is designated as a medium that is capable of storing specific information and has its own privilege level. Examples of the object 1200 may include the file 1210 or the registry key 1220.

Figure 2:
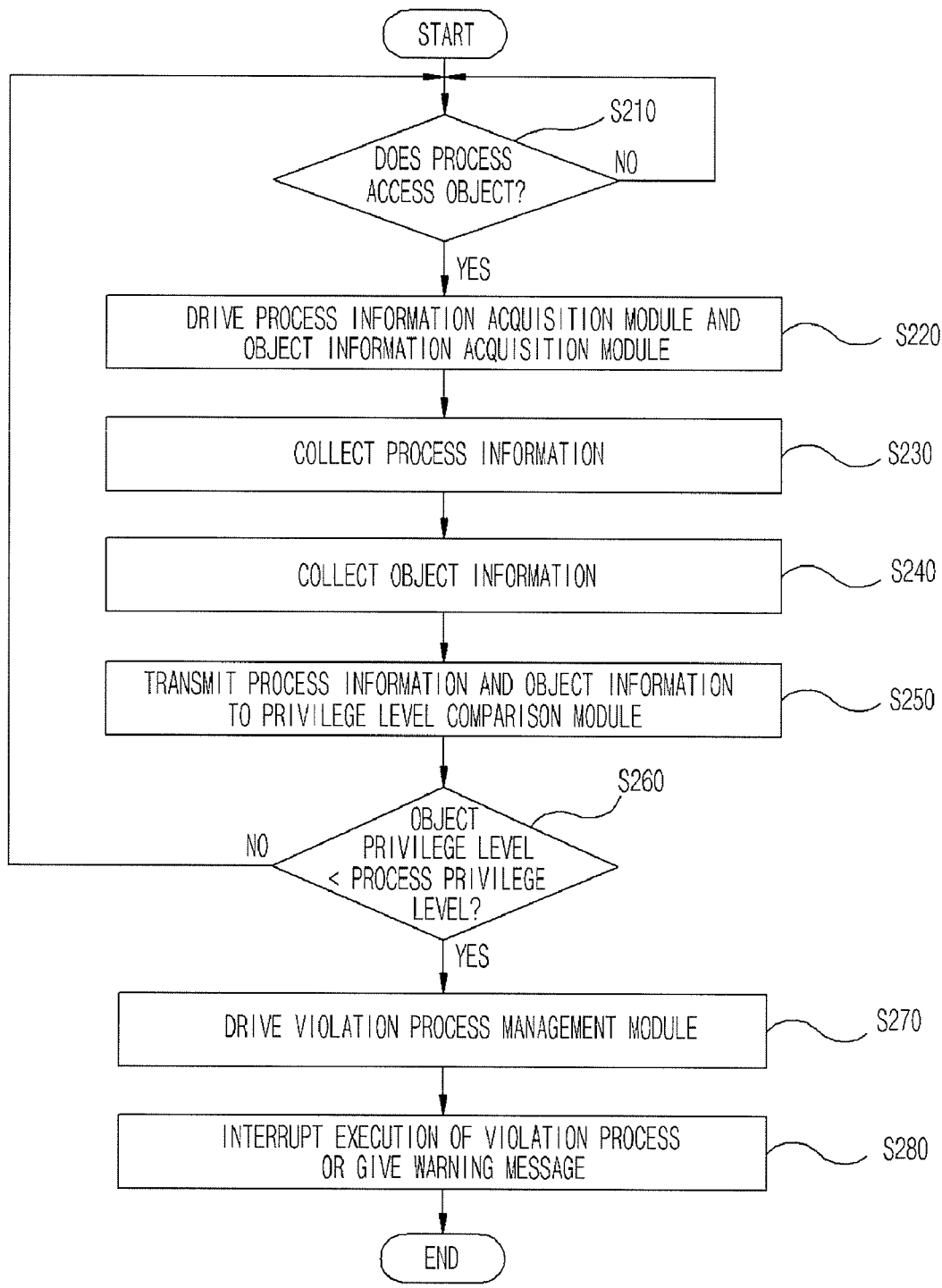
FIG. 2 illustrates a flowchart of a procedure of detecting and controlling a privilege level violation process according to an embodiment of the present invention.

FIG. 2 illustrates a flowchart of a procedure of detecting and controlling a privilege level violation process according to an embodiment of the present invention.

Referring to FIG. 2, in step S210, the process activity monitoring module 1110, which is provided in the apparatus 1100 of detecting and controlling a privilege level violation process, determines whether a specific process or the whole process 1000 existing in the system accesses the object 1200 or not. Here, the term 'access' means 'read'.

In step S220, when it is determined in step S210 that the specific process or the whole process 1000 accesses the specific object 1200, the process activity monitoring module 1110 drives the process information acquisition module 1120 and the object information acquisition module 1130.

In contrast, when it is determined in step S210 that the specific process or the whole process 1000 does not access the specific object 1200, the procedure returns to step S210 and the apparatus 1100 of detecting and controlling a privilege level violation process is still in a stand-by state.

In step S230, the process information acquisition module 1120 acquires information of the process 1000 that accesses the object 1200. Herein, the process information acquired in step S230 contains information with regard to a privilege level, and general information with regard to a pathname and a name of the process 1000, etc.

In step S240, the object information acquisition module 1130 acquires information with regard to the privilege level of the object 1200, and object information with regard to a pathname and a name of the object 1200, etc.

In step S250, each of the process information and object information acquired in step S230 and step S240 is transmitted to the privilege level comparison module 1140, and the privilege level comparison module 1140 collects the process information and the object information.

In step S260, the privilege level comparison module 1140 compares the process information and the object information with each other to determine whether or not the privilege level of the process 1000 is higher than that of the object 1200.

When it is determined in step S260 that the privilege level of the process 1000 is lower than or equal to that of the object 1200, there is no risk of privilege escalation and thus an additional work is not necessary. Therefore, the procedure returns to step S210.

In step S270, when it is determined in step S260 that the privilege level of the process 1000 is higher than that of the object 1200, the privilege level comparison module 1140 drives the violation process management module 1150.

In step S280, the violation process management module 1150 interrupts the execution of the violation process or gives a warning message to a user according to a user's setting because the privilege level of the process 1000 is higher than that of the object 1200 that the process 1000 is trying to access.

Figure 3:
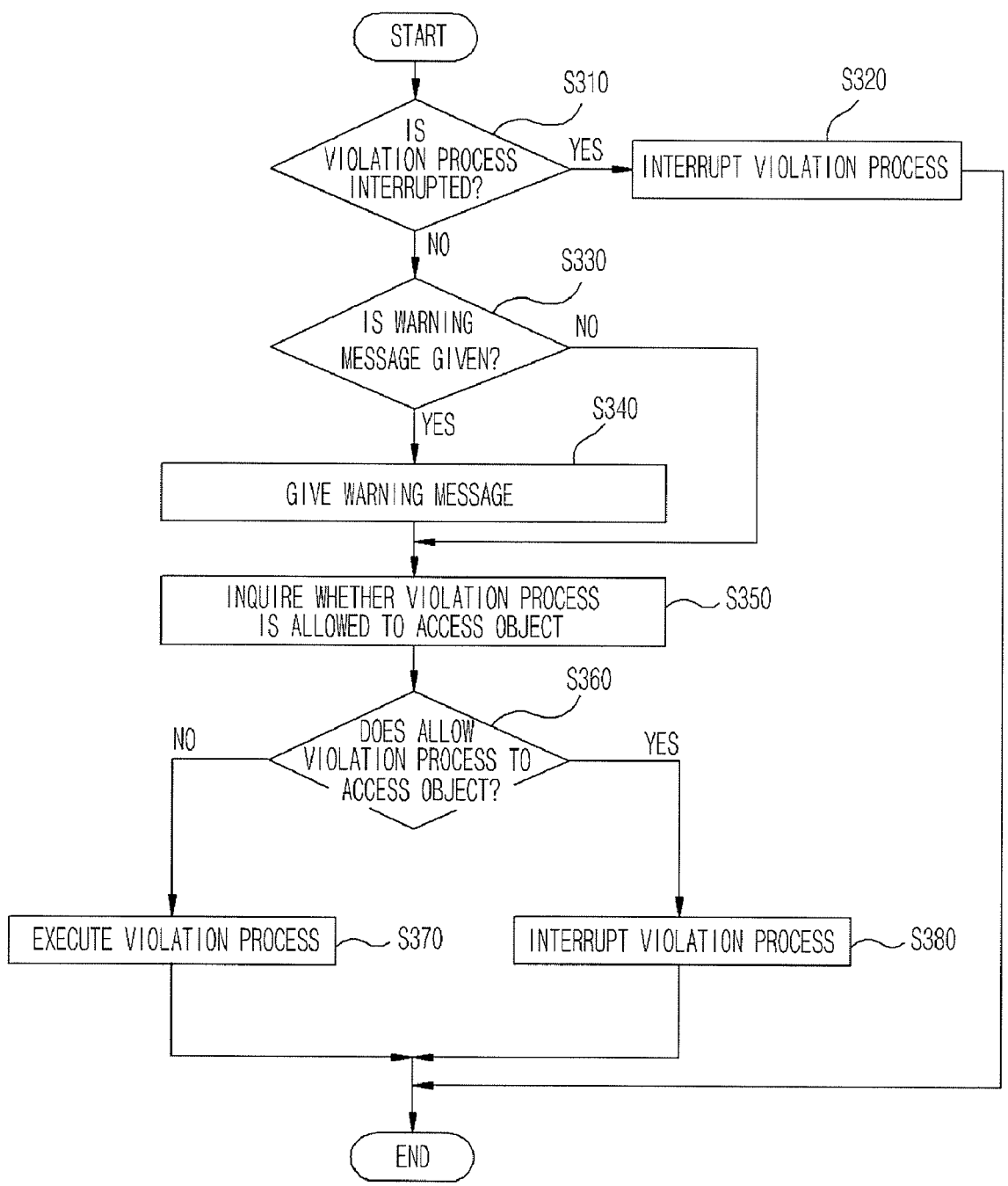
FIG. 3 illustrates a flowchart of a procedure of interrupting execution of a privilege level violation process or giving a warning message to a user according to a user's setting of FIG. 2.

FIG. 3 illustrates a flowchart of a procedure of interrupting the execution of a privilege level violation process or giving a warning message to a user according to a user's setting of FIG. 2.

In step S310, it is determined whether or not a preset user setting is to interrupt the violation process, if the privilege level of the process 1000 is higher than that of the object that the process 1000 is trying to access.

In step S320, when it is determined in step S310 that the user setting is preset to interrupt the violation process, the violation process is interrupted and thus the procedure ends.

In step S330, it is determined whether or not the preset user setting is to give a warning message if it is determined in step S310 that the preset user setting is not to interrupt the violation process.

In step S340, when it is determined in step S330 that the user setting is preset to give a warning message on process violation, the warning message is given to a user.

On the contrary, when it is determined in step S330 that the preset user setting is not to give the warning message on the process violation, the procedure proceeds to step S350.

In the case of outputting the warning message, a name and a pathname of a privilege level violation process, a name and a pathname of an object to be accessed, and privilege levels of the process 1000 and the object 1200 are displayed in the warning message provided by the violation process management module 1150. The user detects that the specific process accesses the lower-privileged object 1200 through the warning message, and may deny or allow the process 1000 to access the lower-privileged object 1200 according to a user's setting.

In step S350, the violation process management module 1150 inquires of a user whether the process 1000 is allowed to access the lower-privileged object 1200, and receives allowance or denial for access from the user.

In step S360, the violation process management module 1150 determines whether or not the process 1000 is allowed to access the lower-privileged object 1200 from a user's input result in step S350.

When inputting the allowance or denial for access, a user should consider the risk of the object and importance of the process compositively, and then determine whether to allow or deny the process 1000 to access the object. If it is determined that the object is safe from the determination result, the user allows the process 1000 to access, i.e., read the object. In contrast, if it is determined that the object is at risk, the user denies the process 1000 to access the object.

In step S370, when it is determined in step S360 that the user allows the process to access the object 1200, the violation process management module 1150 allows the process 1000 to access the object 1200 and execute the process.

On the contrary, in step S380, when it is determined in step S360 that the user does not allow the process to access the object 1200, the violation process management module 1150 denies the process 1000 to access the object 1200.

As described above, in the case where a higher-privileged process trusts information obtained from a lower-privileged object, there is a great likelihood that the higher-privileged process may be misapplied by a lower-privileged process. Therefore, the apparatus of detecting and controlling a privilege level violation process according to the present invention detects that the higher-privileged process is trying to access the lower-privileged object in a system to thereby detecting weaknesses that may be caused by privilege level violation, thus allowing a system to be safely operated.

Furthermore, it is possible to basically remove the weaknesses by interrupting an attempt that the detected privilege level violation process accesses the lower-privileged object.

In addition, since a risk on files or registry keys where warnings are accumulated can be recognized through an event or a warning, it is possible to cope with an attack due to a privilege escalation.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of detecting and controlling a privilege level violation process when a process accesses an object, the method comprising: determining whether the process having a high privilege level accesses the object having a relatively lower privilege level detecting an access of the process to the object; acquiring process information of the process accessing the object; acquiring object information of the object; determining whether a privilege level of the process is higher than a privilege level of the object by comparing the privilege levels with each other using the process information with the object information; and interrupting execution of the process or outputting a warning message according to a user's setting when the privilege level of the process is determined to be higher than the privilege level of the object.

2. The method of claim 1, wherein an access of the process having a high privilege level to the object having a relatively low privilege level is a reading.

3. The method of claim 1, wherein the process information includes information regarding a privilege level of the process and a name and a pathname of the process.

4. The method of claim 1, wherein the object information includes information regarding the privilege level of the object, and a name and a pathname of the object.

5. The method of claim 1, wherein the warning message includes a name and a pathname of a privilege level violation process, a name and a pathname of an object to be accessed, and privilege levels of the process and the object when the warning message is outputted.

6. A method of detecting and controlling a privilege level violation process when a process accesses an object, the method comprising: determining whether the process having a high privilege level accesses the object having a relatively lower privilege level detecting an access of the process to the object; acquiring process information of the process accessing the object; acquiring object information of the object; determining whether a privilege level of the process is higher than a privilege level of the object by comparing the privilege levels with each other using the process information with the object information; and interrupting execution of the process or outputting a warning message according to a user's setting when the privilege level of the process is determined to be higher than the privilege level of the object, wherein interrupting execution of the process or outputting a warning message according to a user's setting comprises: determining whether the user's setting is preset to give the warning message on process violation and giving a warning message to a user when it is determined that the user's setting is preset to give the warning message; inquiring from the user whether the process is allowed to access the lower-privileged object and receiving allowance or denial for access from the user.

7. The method of claim 6, wherein the warning message displays a name and a pathname of the process, a name and a pathname of the object, and privilege levels of the process and the object.

8. The method of claim 6, wherein an access of the process having a high privilege level to the object having a relatively low privilege level is a reading.

9. The method of claim 6, wherein the process information includes information regarding a privilege level of the process and a name and a pathname of the process.

10. The method of claim 6, wherein the object information includes information regarding the privilege level of the object, and a name and a pathname of the object.

11. The method of claim 6, wherein the warning message includes a name and a pathname of a privilege level violation process, a name and a pathname of an object to be accessed, and privilege levels of the process and the object when the warning message is outputted.

* * * * *